Aug. 8, 1961     E. NAGEL     2,995,312
SAUSAGE HANGER MACHINE
Filed Feb. 8, 1956
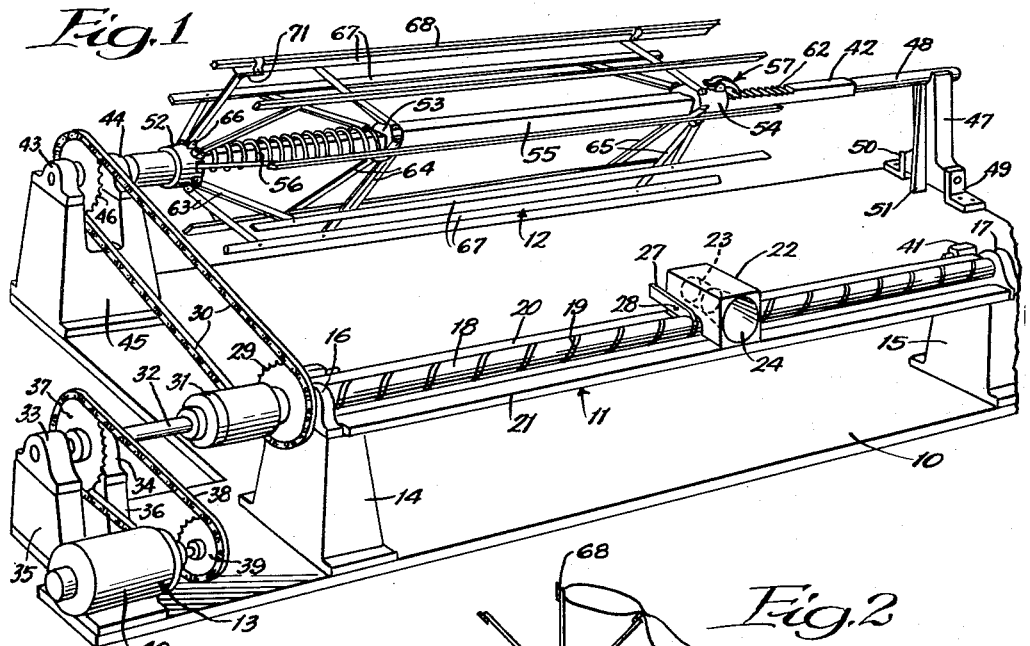
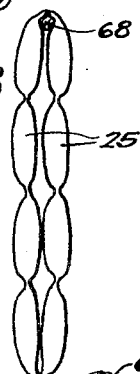
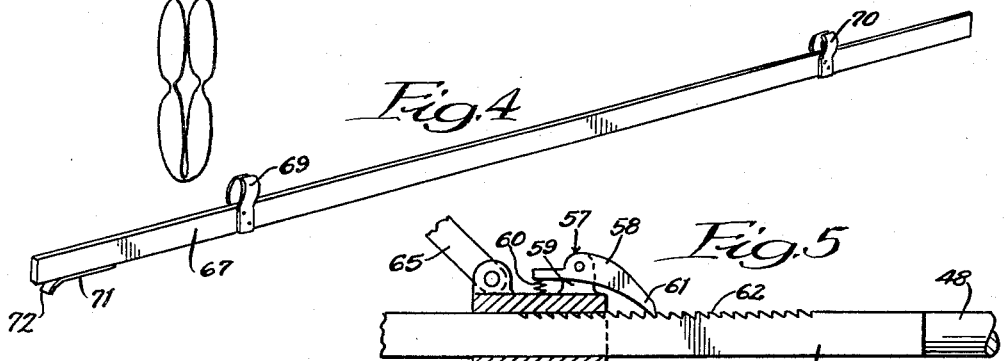
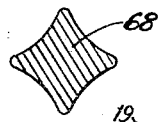
INVENTOR:
Erwin Nagel,
BY
Dawson, Tilton & Graham,
ATTORNEYS.

United States Patent Office 2,995,312
Patented Aug. 8, 1961

2,995,312
SAUSAGE HANGER MACHINE
Erwin Nagel, Chicago, Ill., assignor of one-half to Leon's Sausage Company, a corporation of Illinois
Filed Feb. 8, 1956, Ser. No. 564,146
1 Claim. (Cl. 242—54)

This invention relates to a sausage hanger machine, and more particularly to apparatus for winding sausage links upon a smoke rack bar or stick (generally referred to as a "stick" in the trade—the two terms being used interchangeably hereinafter) preparatory to hanging the bar or stick with the sausage links supported thereon on a sausage cage or truck, that when filled will be moved into a smoke house.

In making sausages, elongated casings are filled or stuffed with sausage meat, ordinarily in a continuous operation that is carried out in a machine called a "stuffer." The filled casings are then formed into links of predetermined lengths, most frequently in apparatus referred to as a linking machine. Following these operations, it is necessary to smoke the sausages, and the links are spirally would loosely on a smoke stick that is then placed on a cage or truck for movement into a smoke room or smokehouse. The smoke stick preferably has a polygonal configuration in cross section rather than round, so that it engages the sausage links in restricted areas, whereby it does not interfere with the atmosphere of the smoke room penetrating the interior of the sausages. After the sausages have hung within the smoke room for a predetermined time, they are transferred into a cooker, after cooking are showered, and thereafter are taken off of the smoke stick and may then be prepared for packaging and shipping.

The casings employed may be either natural or synthetic, and those skilled in the art will appreciate that greater care must be taken in the handling of sausages made with natural casings because they are easily ruptured. The present invention is adapted for use with sausages made with either natural or synthetic casings, but is particularly suited for use with skinless sausages that are formed by using temporary casings that are to be removed from about the meat after the smoking thereof. The present invention is concerned with the step of hanging sausages on the smoke stick; and while this step is customarily a hand operation, an object of this invention is to provide a machine in which the sausage links are wound about the smoke stick or bar automatically.

Sausage links vary in length most generally between four inches and about six inches in increments of one-half inch. When these links are wound about a smoke stick, a certain number of rows are provided and there should be a predetermined number of links in each row. As a specific example, a smoke stick may have a continuous sausage spirally wound thereon to form sixteen spaced apart rows, each of which contains eight sausage links. Another object of this invention is to provide apparatus that is readily and simply adjusted so as to provide the requisite number of sausage links in each row, irrespective of the particular length of the sausage links being handled by the machine at any given time.

Still another object of the invention is to provide winding apparatus having a collapsible reel adapted to support a smoke stick thereon, and in which means are provided for feeding an endless sausage comprising a plurality of separate links to the reel, for rotating the reel and for shifting the feed with respect to the reel so as to form spaced apart, spirally wound rows of sausage links about the bar, each row having a predetermined number of links therein, and in which means are provided for readily removing a stick from the reel after the sausage links have been wound thereon. Yet another object is to provide in winding and hanger apparatus of the character described, a collapsible reel adapted to carry a smoke stick, the reel being collapsed after sausage links have been wound thereabout to position the same for hanging on the smoke rack bar, and expandible to predetermined positions prior to a winding operation so as to provide a predetermined number of sausage links in each row, irrespective of the lengths of the individual sausage links.

A further object of the invention is to provide sausage hanger or winding apparatus provided with a collapsible and expandible reel for carrying a smoke stick, the reel being spring biased to a collapsed position and expandible selectively to various dimensions for accommodating the winding of sausages thereabout having links of any desired length, and in which a sausage guide is movable axially along the reel at a predetermined rate during the rotation thereof, whereby sausages fed through the guide and to the reel are spirally wound thereon. Additional objects and advantages will appear from the specification as it proceeds.

An embodiment of the invention is illustrated in the accompanying drawing, in which—

FIGURE 1 is a perspective view of hanger or winding apparatus embodying the invention; FIGURE 2 is a transverse sectional view of a portion of the apparatus; FIGURE 3 is an end view in elevation of a smoke stick having a sausage suspended therefrom after the bar is removed from the apparatus; FIGURE 4 is a perspective view of a reel rack bar; FIGURE 5 is an enlarged, broken longitdinal sectional view of the locking mechanism for maintaining the reel in expanded condition; FIGURE 6 is an enlarged end view in elevation of the smoke stick or bar; and FIGURE 7 is a broken longitudinal sectional view of the spirally grooved shaft.

The apparatus may be mounted upon a base or platform 10, and for purposes of description it may be divided into three parts—the sauage guide assembly 11, the reel assembly 12 and the drive unit 13. It will be appreciated that a separate base may be employed, as is illustrated in FIGURE 1, or the separate units 11, 12 and 13 might be mounted directly on the top of a table or other support platform.

The guide assembly 11 comprises a pair of spaced apart mounts 14 and 15, each of which is rigidly secured to the base 10. The mounts 14 and 15 are provided, respectively, at their upper ends with aligned bearings 16 and 17 in which is journaled a shaft 18 having a continuous spirally wound groove or channel 19 formed about the cylindrical surface thereof and extending from end to end of the shaft. Adjacent the lower edge of the shaft 18 and on each side thereof are a pair of elongated bars 20 and 21 that are parallel with the longitudinal axis of the shaft and that extend between the mounts 14 and 15 and are affixed thereto. Slidably supported upon the parallel bars 20 and 21, which in effect provide a track, is a sausage guide 22.

The guide 22 is generally in the form of a rectangular block having a passage or opening 23 extending longitudinally therethrough that is flared outwardly at one end, as is shown at 24. The passage 23 is adapted to pass sausage links 25 therethrough, as is shown in FIGURE 2, and the flared end 24 of the passage facilitates feeding of the sausage links thereinto. Centrally and extending transversely thereof, the guide is formed with a semicylindrical channel or recess 26 thereacross that is adapted to partially receive therein the shaft 18. Preferably, the interrelation of the shaft 18, bar supports 20 and 21 and channel 26 is such that the shaft is freely rotatable within the channel 26, while the guide 22 may move longitudinally of the shaft while supported on the bars 20 and 21 independently of the shaft 18.

On one side thereof, the guide 22 carries a key or latch 27 that is supported for pivotal movement with respect to the guide on a pivot pin 28. The key 27 has a portion thereof extending inwardly beyond the end of the guide 22, and is so positioned that the opposite end thereof may be pivoted downwardly and into the spiral groove 19. If the free end of the key is swung downwardly, as viewed in FIGURE 1, the outer end of the key will swing upwardly and out of engagement with the groove 19.

The shaft 18 extends beyond the mount 14, and on the outer side of that mount is equipped with a sprocket wheel 29 which has an endless link chain 30 entrained thereabout. The shaft is connected to a drive member 31 which may be in the form of a clutch, such as a Warner electric clutch. The infeed side of the clutch 31 is connected to a shaft 32 that is supported for rotation within the bearings 33 and 34 provided, respectively, by spaced apart mounts 35 and 36. Interposed between the mounts 35 and 36 is a sprocket wheel 37 that is fixed to the shaft 31 so as to rotate therewith. Entrained about the sprocket 37 is a drive chain 38 that is also entrained about a drive sprocket 39 carried by the shaft of a drive motor 40. The motor 40 and mounts 35 and 36 are rigidly secured to the base 10 by bolts or studs, or any other appropriate means.

It will be apparent from this description that when the motor 40 is energized, the shaft 18 will be rotated through the clutch 31; and that if the key 27 has the inner end thereof positioned within the spiral groove 19, the guide 22 will move along the shaft 18 and toward the right end thereof, as viewed in FIGURE 1. Desirably, the motor 40 is de-energized automatically when the guide 22 approaches the outer end of the shaft 18 (that is, the mount 15); and for this purpose, a microswitch 41 is carried by the mount 15 and is positioned so as to be triggered by the guide as it approaches the mount. The switch 41 will be connected in a circuit (not shown) with the motor 40 so that, when triggered, it will interrupt the motor circuit and thereby de-energize the motor.

The reel assembly 12 includes an elongated shaft 42 that at one end is supported within the spaced apart bearings 43 and 44 that are carried by the bifurcated ends of a support member or mount 45 that is rigidly mounted on the base 10. Secured to the shaft 42 intermediate the bearings is a driven sprocket 46 which has an endless chain 30 entrained thereabout.

In some instances, it may be desirable to provide a support for the shaft 42 at the opposite end thereof although it will be appreciated that such a support may be unnecessary if the shaft and its bearing supports have sufficient integral strength. In the illustration of FIGURE 1, a support is shown and is designated with the numeral 47. The support 47 at its upper end is arcuate so as to rotatably support the cylindrical end portion 48 of the shaft 42 therein. The support 47 is spaced slightly above the base 10 and is carried for pivotal movement by the brackets 49 and 50 which are bolted or otherwise rigidly secured to the base 10. Along its inner side, the support 47 is equipped with a leg or stop member 51 that is adapted to engage the upper surface of base 10 when the support is in a vertical position, and thereby prevents further pivotal movement of the support member in a counter-clockwise direction, as viewed in FIGURE 1. On the other hand, the support 47 is free to pivot in the opposite direction so as to withdraw it from the shaft end portion 48.

Adjacent the mount 45 but spaced slightly therefrom, the shaft 42 carried a collar 52 that is affixed thereto so that it cannot move longitudinally therealong. Spaced from the collar 52 and slidably received upon the shaft 42 is a slide collar 53 that has a generally square-shaped opening therethrough to receive the correspondingly square-shaped shaft. The shaft 42 carries a further slide collar or sleeve 54 that also has a generally square-shaped opening therethrough to accommodate the shaft.

The collars 53 and 54 are spaced apart by an elongated spacer 55 that extends therebetween and that, in the illustration given, is square-shaped, receives the shaft 42 therein and is slidable therealong. If desired, the collars 53 and 54 may be rigidly secured to the spacer sleeve 55 although this is not a requisite.

Interposed between the collars 52 and 53 is a coil spring 56 that provides a biasing force between the collars tending to move the collar 53 toward the right, as seen in FIGURE 1. That same biasing force transmitted through the spacer 55 will tend to move the lock collar 54 to the right. In order to locate the movable collars 53 and 54 with respect to the stationary collar 52 at selected points along the shaft, a locking arrangement 57 is provided; and while it may take various forms, the one specifically illustrated comprises a pawl 58 supported for pivotal movement between spaced apart ears 59 carried by the collar 54. The pawl is biased or loaded by a spring 60 seating against it and the collar 54 to bring the free end portion 61 of the pawl into engagement with the teeth or notches 62 carried by the shaft 42 along the upper surface thereof. The teeth extend for a restricted distance along the shaft, and a sufficient number of teeth are provided so as to afford selective location of the collar 54 in order that the diameter of the reel can be made to accommodate the lengths of sausage links being fed into the apparatus for a winding operation.

Each of the collars 52, 53 and 54 is equipped with a plurality of spokes extending generally radially outwardly therefrom, and the spokes of the various collars are designated with the numerals 63, 64 and 65 for purposes of identification. In the illustration given, each of the collars is provided with eight spokes, and these spokes are pivotally carried by the collars by means of pivot pins that extend through the spaced legs of mounting fixtures 66. It will be apparent that the spokes are free to pivot unless otherwise constrained, as is the case, through arcs of slightly more than 180°.

The spokes 63, 64 and 65 are aligned with each other longitudinally of the shaft 42, and the aligned spokes of each of these groups is pivotally secured to a reel bar 67. Therefore, since eight spokes are provided in each group, eight separate reel bars are also provided. It will be apparent that the collars, spokes and reel bar interconnections described provide a spider reel structure that is generally similar in its functioning to that of an umbrella. That is to say, it can be collapsed to reduce the distance between each pair of reel bars 67, simply by depressing the pawl 58 against the biasing force of the spring 60 to permit the coil spring 56 to shift the collars 53 and 54 toward the right in FIGURE 1. On the other hand, the reel can be expanded by pushing the collar 54 toward the left, and may be extended the amount desired simply by permitting the pawl 58 to lock in the appropriate tooth 62. It will also be apparent that when the motor 40 is energized so as to drive the shaft 18 of the guide assembly, the shaft 42 and the reel carried thereby will also be rotated through the drive chain 30 and sprocket 46.

As has been brought out before, elongated sausages comprising a plurality of links 25 are spirally wound about a smoke rack bar in preparation for supporting the sausage in a smoke room, ordinarily on a cage moved thereinto. In the drawing, a smoke rack bar is shown best in FIGURE 6, and it is indicated with the numeral 68. The smoke rack bar or stick 68 is somewhat longer than the reel bars 67 and it, or preferably at least one of the reel bars, should be equipped with means for removably securing the smoke rack bar to the reel. The drawing illustrates (most clearly in FIGURE 4) an arrangement wherein a spider or reel bar 67 is equipped with means for removably securing it to the smoke stick, and such means comprises a pair of spaced apart spring clips 69 and 70. These spring clips are rigidly secured to the reel bar and are adapted to slip over the smoke stick and frictionally grip the same.

Further, means should be provided in the apparatus for securing the end of an elongated sausage to the smoke rack bar, or preferably to one of the spider or reel bars, to permit that sausage to be wound about the reel when the reel rotates. Again, the drawing illustrates an arrangement wherein the reel bar shown in FIGURE 4 is provided with an exemplary means for accomplishing this result, and it comprises an elongated spring clip 71 that extends outwardly along the bar and has a laterally turned end 72 to permit the end of a sausage link to be slipped thereunder.

*Operation*

In operation of the assembly, the reel will be extended to the amount desired simply by pushing the collar 54 to the left along the shaft 42 and permitting the pawl to engage the appropriate tooth. Thereafter, the smoke rack bar 68 will be clipped to one of the reel bars 67, as shown in FIGURE 1. The guide 22 will be pushed toward the left and substantially into abutment with the mount 14, and such movement of the guide is accomplished quickly by pivoting the finger 27 so as to lift it from the spiral channel 19.

An endless sausage coming from the link machine and having a plurality of links 25 formed therein, is fed through the guide 22, and a free end of the sausage is clipped beneath the spring clip 71. The apparatus is now prepared for a winding operation, and the switch control for the motor 40 may be closed to energize the motor. The motor through the clutch 31 will drive the shafts 18 and 42, whereby the sausage will be fed through the guide 22 and wound about the expanded reel and over the smoke rack bar 68 carried thereby. The sausage will be spirally wound about the reel because of the progressive movement of the guide 22 along the shaft 18. The winding operation will be terminated automatically when the guide 22 triggers the microswitch 41, which then de-energizes the motor 40.

The operator of the apparatus will then sever the sausage, will tie the two ends thereof, and will then pivot the support 47 in a clockwise direction to withdraw it from the shaft 42. Next, the operator will depress the pawl 58 to permit the reel to collapse. Thereafter, the smoke rack bar 68 may be removed from the reel bar to which it has been attached, and the smoke rack bar or stick with the spirally wound sausage thereon is moved bodily along the shaft 42 to remove the sausage therefrom. The sausage links will then resume the position shown in FIGURE 3 with respect to the smoke rack stick and may be placed on a cage for movement into a smoke house.

The next winding operation is commenced by returning the guide 22 to its starting position, expanding the reel to the extent desired, and by again pivoting the support 47 into the position shown in FIGURE 1. Since the end of the sausage has already been tied, it is simply secured to the reel by the spring fastener 71 for another operation. It should be noted that the smoke rack bar should be secured to the same reel bar, for then the same number of sausage links will be wound about the reel in each operational cycle, because the guide 22 in each cycle of operation moves through the same distance, and its movement controls the length of time that a winding operation continues. It is obvious that automatic return devices may be incorporated in the apparatus to move the guide 22 from the terminal end of the shaft 18 to the opposite end thereof. It should be brought out that the spiral groove 19 terminates a spaced distance from the mount 15 so that when the guide 22 abuts the microswitch 41, the finger 27 is automatically lifted from the groove to condition the guide for rapid return movement to the starting end of the shaft. A comparable arrangement would be to make the groove 19 gradually become more shallow or disappear adjacent the terminal end of the shaft so that the same conditioning result would be provided as seen in FIGURE 7.

While in the foregoing specification an embodiment of the invention has been described in considerable detail for purposes of adequately disclosing the same, it will be apparent to those skilled in the art that numerous changes may be made in those details without departing from the spirit and principles of the invention.

I claim:

In a machine for winding a plurality of link sausages defining a continuous length thereof upon an elongated smoke stick of polygonal cross section in spiral loops therealong, an elongated and generally planar base, a pair of longitudinally spaced supports extending upwardly from said base and being in substantial longitudinal alignment, a generally horizontally disposed winding reel carried by said supports for rotational movement about its own longitudinal axis, one of said supports being mounted upon said base for selective pivotal movement generally along the axis of said reel between a first upwardly extending reel-supporting position and a second generally horizontal position remote from said reel to enable sausages wound thereabout to be removed therefrom, said reel comprising an elongated, longitudinally extending reel shaft equipped with a first fixedly mounted collar having a plurality of pivotally mounted spokes secured thereto in angularly spaced relation thereabout and being equipped also with a second slidably mounted collar having a plurality of pivotally mounted spokes secured thereto in angularly spaced relation thereabout, said reel further comprising a plurality of reel bars respectively pivotally secured to the corresponding spokes of said first and second collars, said second slidable collar being movable along said shaft between a first position in which said reel is completely collapsed and a second position in which said reel is fully expanded, latch structure having elements respectively carried by said second collar and by said shaft for locking said second collar in any one of a plurality of positions including the aforesaid first and second positions thereof and positions intermediate the same, a guide assembly for feeding sausage links to said winding reel and including an elongated, generally horizontal guide shaft transversely spaced from said reel and substantially parallel thereto, said guide shaft being supported for rotational movement about the longitudinal axis thereof and being provided with a longitudinally extending spiral channel along the peripheral surface thereof progressively diminishing in depth and disappearing completely adjacent the terminal end of said guide shaft, said guide assembly also including bar structure extending along said guide shaft in substantially parallel relation therewith and being disposed therebelow, a guide block also comprising a component of said guide assembly and being wholly supported by said bar structure for movement along the length thereof between the initiating and terminal ends of said guide shaft, said guide block having a generally horizontally disposed passage extending therethrough in transverse relation to said guide shaft, said passage being generally cylindrical throughout the end portion thereof adjacent said reel and being flared outwardly to define a generally frusto-conical configuration throughout the end portion thereof remote from said reel, a key carried by said guide block for selective movement into and out of said channel to effect a driving relation when in said channel between said second guide shaft and guide block and thereby control longitudinal movement of said guide block in relation to rotational movement of said guide shaft, said channel adjacent the terminal end thereof being effective to automatically disengage said key therefrom to discontinue such driving relation, drive mechanism for rotating said winding reel and guide shaft in enforced synchronism, and a pair of longitudinally spaced spring clips carried by one of said reel bars intermediate and remote from the ends thereof and each of said spring clips having a pair of spring legs defining a bowed opening therebetween adapted to releasably receive such smoke stick therein to mount the same upon said reel during a sausage-winding operation.

References Cited in the file of this patent

UNITED STATES PATENTS

| | | |
|---|---|---|
| 1,867,688 | Van Hook | July 19, 1932 |
| 1,933,722 | Farrar | Nov. 7, 1933 |
| 2,087,673 | Lisberg | July 20, 1937 |
| 2,229,988 | Pitt et al. | Jan. 28, 1941 |
| 2,396,958 | Mackmann | Mar. 19, 1946 |
| 2,446,583 | Gopner | Aug. 10, 1948 |
| 2,650,035 | Egee | Aug. 25, 1953 |
| 2,653,773 | Davis | Sept. 29, 1953 |
| 2,699,297 | Weinreich et al. | Jan. 11, 1955 |
| 2,781,988 | Peschke | Feb. 19, 1957 |